June 10, 1941.　　E. M. UNDERWOOD　　2,244,814
REVOLVING CONE MIXER
Original Filed Aug. 3, 1937

Inventor
Elvin M. Underwood
By Vernon E. Hodges
H. Hamlin Hodges his Attorneys

Patented June 10, 1941

2,244,814

UNITED STATES PATENT OFFICE 2,244,814

REVOLVING CONE MIXER

Elvin M. Underwood, East Liverpool, Ohio, assignor to The Patterson Foundry & Machine Co., East Liverpool, Ohio, a corporation of Ohio Original application August 3, 1937, Serial No. 157,191. Divided and this application March 25, 1939, Serial No. 264,221

1 Claim. (Cl. 259—96)

My invention relates to an improvement in revolving cone mixers.

This is a division of my application Serial No. 157,191, filed in the United States Patent Office August 3, 1937.

The object of my present invention is to provide revolving cones which are immersed within a liquid solution to be mixed. These cones are carried by a rotary shaft with the apex of the cone or the smaller part of a truncated cone disposed toward the top, bottom or side of the tank. The cones may also be affixed to the shaft with the apex or the smaller end of a truncated cone near the edge of the mixing tank or near the center thereof.

In the form illustrated, the tank 2 is preferably provided with a curved bottom 4.

Figure 1:
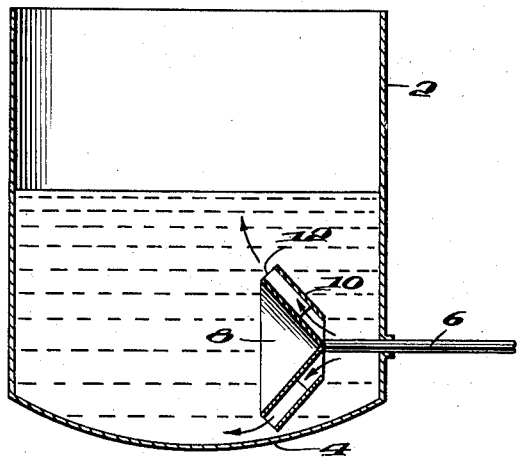
Fig. 1 is a diagrammatic cross-section of a double cone having longitudinally extending blades between the cones affixed to a horizontally disposed shaft.

In Fig. 1, I have shown a horizontally disposed shaft 6, having a cone 8 secured to the end within the tank and around the outside thereof a truncated cone 10 is secured. This is secured to the cone 8 by blades or baffles 12, which are interposed between the cone 8 and the truncated cone 10 preferably extending longitudinally or in radial planes parallel with the shaft, they serve not only as positioning elements to hold the cone together but also to assist in agitating the mixture in which this form of agitator is utilized. The arrows indicate the direction in which the fluid circulates upon the rotation of the shaft 6.

Figure 2:
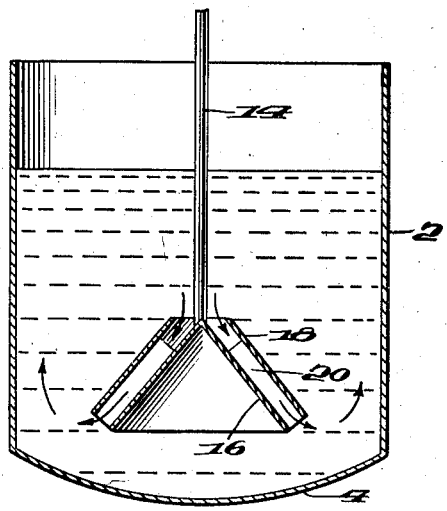
Fig. 2 is a diagrammatic cross-section of a double cone affixed to a vertical shaft.
Figure 3:
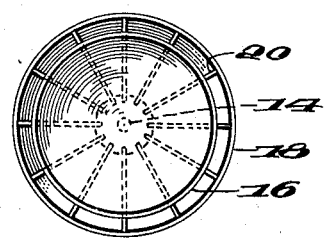
Fig. 3 is a bottom plan view of the cone shown in Fig. 2.

In Figs. 2 and 3, I have illustrated a vertically disposed shaft 14, on the lower end of which is secured a cone 16, around which is mounted a truncated cone 18, which is supported over the cone 16 by blades or baffles 20, which latter serve the purpose not only of supporting the cone 18 but assisting in the circulation of the mixture between the two cones in the same manner in which the cone and truncated cone in Fig. 1 function.

The arrows indicate the direction of circulation of the mixture within the tank.

It is my intention to make various different combinations of these elements, and, therefore, it is to be understood that these changes may be made from time to time as additional discoveries are made as to the extent of agitation created without departing from the spirit of the invention and the scope of the appended claim.

I claim:

A mixer including a tank, a shaft rotatable therein, two concentric nested cones spaced apart and carried by the shaft, one cone open at one end only and the other open at both ends, and longitudinal baffles secured to both cones and holding the cones apart to provide separated passageways therebetween.

ELVIN M. UNDERWOOD.